United States Patent
Appleman et al.

(10) Patent No.: US 10,599,620 B2
(45) Date of Patent: Mar. 24, 2020

(54) METHOD AND SYSTEM FOR OBJECT SYNCHRONIZATION IN CRM SYSTEMS

(75) Inventors: Daniel S. Appleman, San Jose, CA (US); Roan Bear, Santa Cruz, CA (US); Andrea Wildt, San Francisco, CA (US); Bonnie Crater, Portola Valley, CA (US)

(73) Assignee: Full Circle Insights, Inc., San Mateo, CA (US)

( * ) Notice: Subject to any disclaimer, the term of this patent is extended or adjusted under 35 U.S.C. 154(b) by 0 days.

(21) Appl. No.: 13/602,157

(22) Filed: Sep. 1, 2012

(65) Prior Publication Data

US 2013/0117228 A1 May 9, 2013

Related U.S. Application Data

(60) Provisional application No. 61/635,661, filed on Apr. 19, 2012, provisional application No. 61/635,666, filed on Apr. 19, 2012, provisional application No. 61/530,216, filed on Sep. 1, 2011.

(51) Int. Cl.
*G06F 16/178* (2019.01)
*G06F 16/27* (2019.01)

(52) U.S. Cl.
CPC .......... *G06F 16/178* (2019.01); *G06F 16/273* (2019.01)

(58) Field of Classification Search
CPC ......... G06F 17/30578; G06F 17/30581; G06F 16/178; G06F 16/273; Y10S 707/954
USPC ....................................................... 707/626
See application file for complete search history.

(56) References Cited

U.S. PATENT DOCUMENTS

| | | | | |
|---|---|---|---|---|
| 5,315,709 | A * | 5/1994 | Alston, Jr. | G06F 16/258 |
| 5,734,720 | A * | 3/1998 | Salganicoff | G06Q 20/383 |
| | | | | 348/E7.056 |
| 5,950,193 | A * | 9/1999 | Kulkarni | G06Q 10/107 |
| 6,119,125 | A * | 9/2000 | Gloudeman | G06F 8/20 |
| 6,345,288 | B1 * | 2/2002 | Reed | H04L 63/045 |
| | | | | 707/999.001 |
| 6,523,041 | B1 * | 2/2003 | Morgan | G06Q 30/02 |
| 6,725,239 | B2 * | 4/2004 | Sherman | G06F 17/30578 |
| 6,751,663 | B1 * | 6/2004 | Farrell | H04L 63/08 |
| | | | | 709/223 |
| 6,757,689 | B2 * | 6/2004 | Battas | G06Q 10/06 |
| 6,779,002 | B1 * | 8/2004 | Mwaura | G06F 16/27 |
| 7,028,212 | B1 * | 4/2006 | Nair | G06F 11/261 |
| | | | | 703/23 |
| 7,130,877 | B2 * | 10/2006 | McNeely et al. | 709/201 |
| 7,155,571 | B2 * | 12/2006 | Lavoie | G06F 12/0875 |
| | | | | 707/999.003 |

(Continued)

FOREIGN PATENT DOCUMENTS

EP 2 017 748 A1 * 1/2009 ............ G06F 17/30

*Primary Examiner* — Phuong Thao Cao
(74) *Attorney, Agent, or Firm* — Guadalupe M. Garcia; Barcelo, Harrison & Walker LLP

(57) ABSTRACT

In an embodiment of the present invention, a Response object collects and synchronizes information from other types of objects as may be implemented in a CRM system. For example, certain objects may include a Lead or Contact Object, a Campaign object, and an Opportunity Object that is synchronized into a Response object. In this way, the results for a given Lead or Contact can be directly attributed to the Campaign or Opportunity without having to guess as may be necessary in certain typical CRM systems.

21 Claims, 10 Drawing Sheets

(56) References Cited

U.S. PATENT DOCUMENTS

| | | | | |
|---|---|---|---|---|
| 7,293,047 B2* | 11/2007 | Dunn | ............... | G06F 17/30578 |
| 7,386,565 B1* | 6/2008 | Singh et al. | | |
| 7,680,838 B1* | 3/2010 | Shaw | ............... | G06F 17/30144 |
| | | | | 707/610 |
| 7,707,179 B2* | 4/2010 | Holt | ............... | G06F 9/445 |
| | | | | 707/620 |
| 7,734,577 B2* | 6/2010 | Dunn et al. | ............... | 707/608 |
| 7,797,273 B2* | 9/2010 | Levi | ............... | G06F 16/275 |
| | | | | 707/609 |
| 7,809,682 B2* | 10/2010 | Paterson | ............... | G06F 16/275 |
| | | | | 707/625 |
| 7,822,775 B2* | 10/2010 | Langer | ............... | G06F 17/30595 |
| | | | | 707/717 |
| 7,870,097 B2* | 1/2011 | Dunn et al. | ............... | 707/621 |
| 7,940,910 B2* | 5/2011 | Chatterjee et al. | ............... | 379/218.01 |
| 8,019,737 B2* | 9/2011 | Kocsis | ............... | G06F 17/30297 |
| | | | | 707/616 |
| 8,131,670 B2* | 3/2012 | I Dalfo et al. | ............... | 707/610 |
| 8,200,622 B2* | 6/2012 | Hoang | ............... | 707/610 |
| 8,312,033 B1* | 11/2012 | McMillan | ............... | G06Q 10/10 |
| | | | | 707/758 |
| 8,447,745 B2* | 5/2013 | Ahuja et al. | ............... | 707/703 |
| 8,571,882 B1* | 10/2013 | Teitelbaum | ............... | G06F 17/30575 |
| | | | | 705/2 |
| 9,361,593 B2* | 6/2016 | Ambrose | ............... | G06Q 10/00 |
| 2001/0042139 A1* | 11/2001 | Jeffords | ............... | G06F 9/5016 |
| | | | | 719/316 |
| 2002/0184222 A1* | 12/2002 | Kohut | ............... | G06F 17/30286 |
| 2003/0046434 A1* | 3/2003 | Flanagin et al. | ............... | 709/248 |
| 2003/0074342 A1* | 4/2003 | Curtis | ............... | G06Q 10/10 |
| 2003/0135512 A1* | 7/2003 | Morgan, Jr. | ............... | G06F 17/30882 |
| 2003/0140058 A1* | 7/2003 | Martin et al. | ............... | 707/103 R |
| 2004/0006506 A1* | 1/2004 | Hoang | ............... | G06Q 10/10 |
| | | | | 705/14.65 |
| 2004/0024795 A1* | 2/2004 | Hind | ............... | G06F 17/30581 |
| 2004/0088221 A1* | 5/2004 | Katz | ............... | G06O 30/02 |
| | | | | 705/14.13 |
| 2004/0098363 A1* | 5/2004 | Anglin | ............... | G06F 17/30067 |
| 2004/0133542 A1* | 7/2004 | Doerksen et al. | ............... | 707/1 |
| 2004/0153965 A1* | 8/2004 | O'Rourke | ............... | G06F 17/243 |
| | | | | 715/223 |
| 2004/0220955 A1* | 11/2004 | McKee | ............... | G06Q 30/02 |
| 2004/0267834 A1* | 12/2004 | Sasaki | ............... | G06F 16/178 |
| 2005/0021502 A1* | 1/2005 | Chen | ............... | G06F 17/30914 |
| 2005/0032527 A1* | 2/2005 | Sheha et al. | ............... | 455/456.1 |
| 2005/0055275 A1* | 3/2005 | Newman | ............... | G06Q 30/02 |
| | | | | 705/14.41 |
| 2005/0071195 A1* | 3/2005 | Cassel | ............... | G06Q 10/10 |
| | | | | 705/2 |
| 2005/0071320 A1* | 3/2005 | Chkodrov | ............... | G06F 17/30489 |
| 2005/0086384 A1* | 4/2005 | Ernst | ............... | H04L 12/00 |
| | | | | 709/248 |
| 2005/0091250 A1* | 4/2005 | Dunn | ............... | G06F 17/30575 |
| 2005/0091284 A1* | 4/2005 | Weissman | ............... | G06Q 10/10 |
| 2005/0091592 A1* | 4/2005 | Dunn | ............... | G06F 17/30578 |
| | | | | 715/248 |
| 2005/0235274 A1* | 10/2005 | Mamou | ............... | G06F 17/30563 |
| | | | | 717/136 |
| 2005/0240592 A1* | 10/2005 | Mamou | ............... | G06F 17/30563 |
| 2005/0278385 A1* | 12/2005 | Sutela et al. | ............... | 707/200 |
| 2006/0010195 A1* | 1/2006 | Mamou | ............... | G06Q 10/10 |
| | | | | 709/203 |
| 2006/0020804 A1* | 1/2006 | Schleifer | ............... | G06F 16/275 |
| | | | | 713/176 |
| 2006/0036619 A1* | 2/2006 | Fuerst et al. | ............... | 707/100 |
| 2006/0041596 A1* | 2/2006 | Stirbu et al. | ............... | 707/200 |
| 2006/0069717 A1* | 3/2006 | Mamou | ............... | G06F 17/30563 |
| | | | | 709/203 |
| 2006/0080363 A1* | 4/2006 | Vadlamani et al. | ............... | 707/200 |
| 2006/0080468 A1* | 4/2006 | Vadlamani et al. | ............... | 709/250 |
| 2006/0085483 A1* | 4/2006 | Mooney | ............... | G06F 17/30578 |
| 2006/0106868 A1* | 5/2006 | Shim | ............... | G06Q 10/10 |
| 2006/0230063 A1* | 10/2006 | Pollinger | ............... | G06F 16/289 |
| 2007/0041571 A1* | 2/2007 | Chatterjee et al. | ............... | 379/355.02 |
| 2007/0156754 A1* | 7/2007 | Busch | ............... | G06F 16/2423 |
| 2007/0180075 A1* | 8/2007 | Chasman | ............... | G06F 17/30575 |
| | | | | 709/223 |
| 2007/0198184 A1* | 8/2007 | Yoshioka | ............... | G01C 21/32 |
| | | | | 701/426 |
| 2007/0198518 A1* | 8/2007 | Luchangco | ............... | G06F 16/2315 |
| 2007/0214064 A1* | 9/2007 | Kahlon et al. | ............... | 705/28 |
| 2007/0226751 A1* | 9/2007 | Brendle et al. | ............... | 719/313 |
| 2007/0239751 A1* | 10/2007 | Wei | ............... | G06F 17/30377 |
| 2008/0065443 A1* | 3/2008 | Gorur et al. | ............... | 705/7 |
| 2008/0133573 A1* | 6/2008 | Haft | ............... | G06F 17/30392 |
| 2008/0140434 A1* | 6/2008 | O'Brien | ............... | G06Q 30/00 |
| | | | | 705/1.1 |
| 2008/0162580 A1* | 7/2008 | Ben Harush | ............... | G06F 17/30699 |
| 2008/0168292 A1* | 7/2008 | Freedman | ............... | G06F 16/9562 |
| | | | | 713/375 |
| 2008/0172629 A1* | 7/2008 | Tien | ............... | G06Q 10/10 |
| | | | | 715/771 |
| 2008/0208919 A1* | 8/2008 | I Dalfo | ............... | G06F 17/30578 |
| 2008/0235663 A1* | 9/2008 | Volkmer | ............... | 717/120 |
| 2009/0024569 A1* | 1/2009 | Langer | ............... | G06F 17/30595 |
| 2009/0030790 A1* | 1/2009 | Ryan | ............... | G06Q 30/02 |
| | | | | 705/14.41 |
| 2009/0037553 A1* | 2/2009 | Yuan | ............... | G06F 17/30575 |
| | | | | 709/209 |
| 2009/0077138 A1* | 3/2009 | Davis | ............... | G06Q 10/06 |
| 2009/0083088 A1* | 3/2009 | Mathew et al. | ............... | 705/7 |
| 2009/0198702 A1* | 8/2009 | Novik et al. | ............... | 707/10 |
| 2009/0210913 A1* | 8/2009 | MacDonald | ............... | H04N 5/782 |
| | | | | 725/85 |
| 2009/0234850 A1* | 9/2009 | Kocsis | ............... | G06F 17/30297 |
| 2009/0254375 A1* | 10/2009 | Martinez | ............... | G06Q 10/00 |
| | | | | 705/3 |
| 2009/0254511 A1* | 10/2009 | Yeap | ............... | G06F 21/6245 |
| 2009/0292649 A1* | 11/2009 | Somech | ............... | G06Q 40/02 |
| | | | | 705/36 R |
| 2010/0030811 A1* | 2/2010 | Ku | ............... | G06Q 30/02 |
| | | | | 707/802 |
| 2010/0049874 A1* | 2/2010 | Chene | ............... | H04L 67/1095 |
| | | | | 709/246 |
| 2010/0223231 A1* | 9/2010 | Lee | ............... | G06F 16/2456 |
| | | | | 707/610 |
| 2010/0261486 A1* | 10/2010 | Sheha et al. | ............... | 455/457 |
| 2010/0325697 A1* | 12/2010 | Terzis | ............... | G06F 21/6218 |
| | | | | 726/3 |
| 2011/0045868 A1* | 2/2011 | Sheha et al. | ............... | 455/556.1 |
| 2011/0078195 A1* | 3/2011 | Bertolini | ............... | G06F 17/30286 |
| | | | | 707/783 |
| 2011/0173294 A1* | 7/2011 | Jackson | ............... | G06F 17/30575 |
| | | | | 709/217 |
| 2011/0209094 A1* | 8/2011 | Gasn et al. | ............... | 715/843 |
| 2011/0231578 A1* | 9/2011 | Nagappan | ............... | H04L 45/586 |
| | | | | 709/248 |
| 2012/0030258 A1* | 2/2012 | Jain et al. | ............... | 707/812 |
| 2012/0072464 A1* | 3/2012 | Cohen | ............... | G06F 17/30303 |
| | | | | 707/803 |
| 2012/0084341 A1* | 4/2012 | Mantri | ............... | H04M 3/42178 |
| | | | | 709/203 |
| 2012/0102036 A1* | 4/2012 | Parker | ............... | G06Q 30/01 |
| | | | | 707/738 |
| 2012/0102232 A1* | 4/2012 | Parker | ............... | G06Q 30/01 |
| | | | | 709/248 |
| 2012/0130941 A1* | 5/2012 | Karthikeyan | ............... | 707/600 |
| 2012/0130945 A1* | 5/2012 | I Dalfo et al. | ............... | 707/610 |
| 2012/0143819 A1* | 6/2012 | Tan | ............... | G06F 16/258 |
| | | | | 707/626 |
| 2012/0143969 A1* | 6/2012 | Shenoy | ............... | G06Q 10/10 |
| | | | | 709/206 |
| 2012/0150548 A1* | 6/2012 | Rajagopalan et al. | ............... | 705/1.1 |
| 2012/0254179 A1* | 10/2012 | Cao | ............... | G06O 30/02 |
| | | | | 707/737 |
| 2012/0290533 A1* | 11/2012 | Pachipala | ............... | G06F 16/275 |
| | | | | 707/626 |
| 2012/0290610 A1* | 11/2012 | Hoang | ............... | G06Q 10/10 |
| | | | | 707/769 |

(56) References Cited

U.S. PATENT DOCUMENTS

| | | | |
|---|---|---|---|
| 2013/0018859 A1* | 1/2013 | Wilkins | G06F 16/9554 707/696 |
| 2013/0110640 A1* | 5/2013 | Powell et al. | 705/14.66 |
| 2013/0167117 A1* | 6/2013 | Razvi et al. | 717/121 |
| 2013/0173918 A1* | 7/2013 | Saraswat | H04L 41/02 713/167 |
| 2013/0218649 A1* | 8/2013 | Beal | G06Q 30/0229 705/14.3 |
| 2013/0254131 A1* | 9/2013 | Hubert | 705/330 |
| 2013/0346842 A1* | 12/2013 | Koara | G05B 19/048 715/211 |
| 2014/0040213 A1* | 2/2014 | Rossi | H04M 15/41 707/693 |
| 2014/0081938 A1* | 3/2014 | Parker, III | G06F 16/252 707/705 |
| 2015/0046524 A1* | 2/2015 | O'Farrell | G06F 8/20 709/203 |

\* cited by examiner

METHOD AND SYSTEM FOR OBJECT SYNCHRONIZATION IN CRM SYSTEMS

CROSS-REFERENCE TO RELATED APPLICATIONS

This application claims priority to U.S. Provisional Application No. 61/530,216 filed Sep. 1, 2011, which is hereby incorporated by reference in its entirety for all purposes.

This application claims priority to U.S. Provisional Application No. 61/635,661 filed Apr. 19, 2012, which is hereby incorporated by reference in its entirety for all purposes.

This application claims priority to U.S. Provisional Application No. 61/635,666 filed Apr. 19, 2012, which is hereby incorporated by reference in its entirety for all purposes.

FIELD OF THE INVENTION

The present invention generally relates to the field of customer relationship management (CRM) system. More particularly, the present invention relates to the synchronization of objects in CRM systems.

BACKGROUND OF THE INVENTION

A customer relationship management (CRM) system is generally a system to manage customer and client relationships, among other things. Applied properly, it can help improve the productivity of a sales team. Unfortunately, traditional CRM systems cannot meet all the needs of a modern sales team.

For example, because of the manner in which certain information is handled, certain information can be lost upon the occurrence of critical events. For example, in certain CRM systems when information for a prospective customer (e.g., lead) is converted into an actual customer (e.g., contact) critical information may be lost. For example, on average, 25-50% of the time companies using a traditional CRM system will convert their leads into contacts. But if a lead is not converted into an opportunity, certain CRM systems cannot connect or track revenue credit to a marketing campaign. This is a significant problem for revenue attribution to marketing campaigns. For example, in traditional CRM systems, the results of many leads in a system may not be well understood.

Also, traditional CRM systems do not keep a historical record of individual events such as responses to determine their effect on a final outcome such as a sale or lost sale. For example, traditional CRM systems may not provide fully descriptive information about the performance of a past marketing campaign. Certain CRM systems may only provide the current status of a lead and lose visibility into the status of the lead during post-campaign follow up, for example.

Traditional CRM systems also may not track whether a response is a new response or one from an existing list of responses. This can be important information to consider. For example, it may be important to know if the pool of contacts is fixed or if new prospects are being reached.

SUMMARY OF THE INVENTION

Therefore, there is a need in the art for a CRM system that can collect information that may otherwise not be collected. There is a further need in the art for a CRM system that can collect information that may otherwise be lost. There is a further need in the art for a CRM system that can collect historical information.

Certain embodiments of the present invention can be deployed as an application, component, or add-on to a CRM system. For example, CRM systems typically include interfaces (e.g., Application Program Interfaces) for extending the functionality of the CRM system. In this way, embodiments of the present invention modify or supplement the behavior of certain CRM systems to extend their functionality as described herein.

In an embodiment of the present invention, a Response object will be described that collects and synchronizes information from other types of objects. For example, in an embodiment of the present invention a Response object will be described as collecting information from a plurality of objects at different points in time. It should be noted that the Response object is a name used in describing the present invention and is not intended to be limiting. Many names can be given to the functionality of embodiments of the present invention.

In an embodiment, information is synchronized from the various objects as they would be contained in a CRM system. For example, in an embodiment of the present invention certain objects may include a Lead or Contact Object, a Campaign object, and an Opportunity Object that is synchronized into a Response object. In this way, the results for a given Lead or Contact can be directly attributed to the Campaign or Opportunity without having to guess as may be necessary in certain typical CRM systems. Embodiments of the present invention provide a synchronization process that normalizes the reporting and sales process across different objects, including Leads, Contacts, Campaigns, and Opportunities, to allow for a unified reporting on sales performance, revenue attribution, and campaign performance.

In certain embodiments of the present invention, information collected in the Response object can be used, for example, by marketers or sales managers, to understand campaign performance. Moreover, detailed reports, charts, and graphs can be generated from such information using tools otherwise available from the CRM systems as would be understood by those of ordinary skill in the art.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

DETAILED DESCRIPTION OF THE INVENTION

Figure 1:
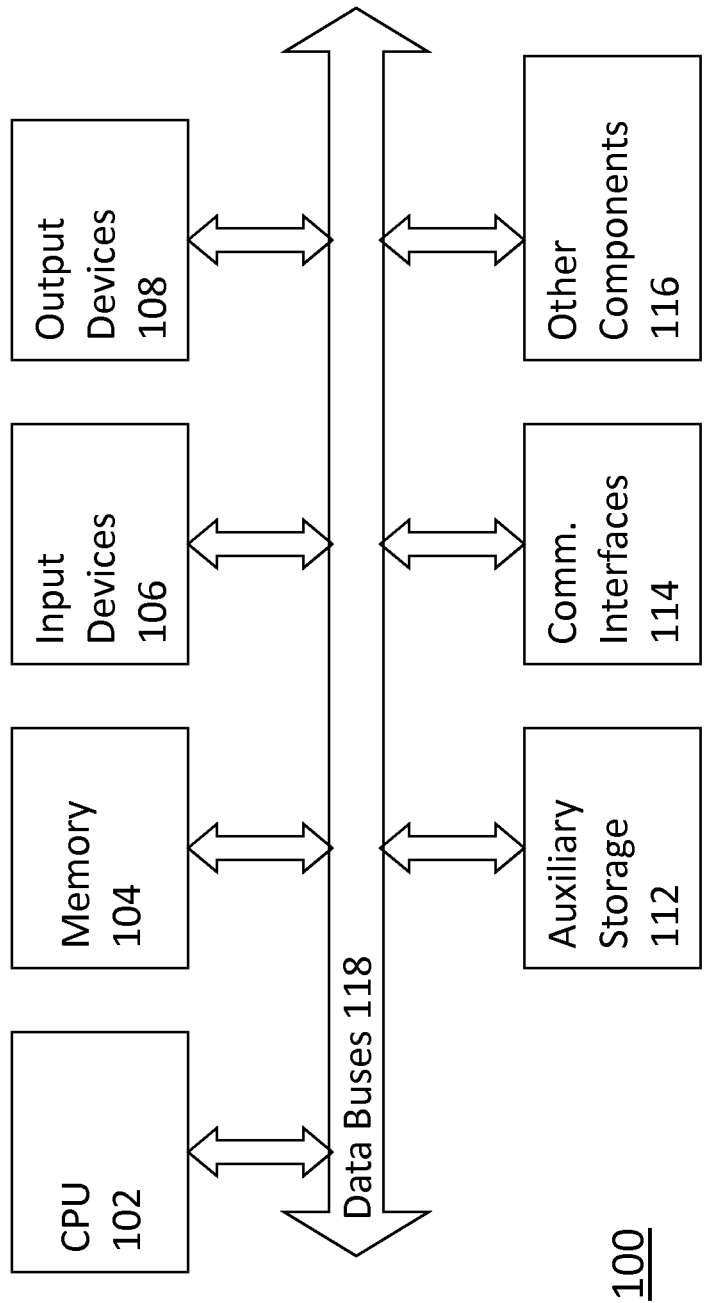
FIG. 1 is a block diagram of a computer system on which the present invention can be implemented.

Among other things, the present invention relates to methods, techniques, and algorithms that are intended to be implemented in digital computer system 100 such as generally shown in FIG. 1. Such a digital computer or embedded device is well-known in the art and may include the following.

Computer system 100 may include at least one central processing unit 102 but may include many processors or processing cores. Computer system 100 may further include memory 104 in different forms such as RAM, ROM, hard disk, optical drives, and removable drives that may further include drive controllers and other hardware. Auxiliary storage 112 may also be include that can be similar to memory 104 but may be more remotely incorporated such as in a distributed computer system with distributed memory capabilities.

Computer system 100 may further include at least one output device 108 such as a display unit, video hardware, or other peripherals (e.g., printer). At least one input device 106 may also be included in computer system 100 that may include a pointing device (e.g., mouse), a text input device (e.g., keyboard), or touch screen.

Communications interfaces 114 also form an important aspect of computer system 100 especially where computer system 100 is deployed as a distributed computer system. Computer interfaces 114 may include LAN network adapters, WAN network adapters, wireless interfaces, Bluetooth interfaces, modems and other networking interfaces as currently available and as may be developed in the future.

Computer system 100 may further include other components 116 that may be generally available components as well as specially developed components for implementation of the present invention. Importantly, computer system 100 incorporates various data buses 116 that are intended to allow for communication of the various components of computer system 100. Data buses 116 include, for example, input/output buses and bus controllers.

Indeed, the present invention is not limited to computer system 100 as known at the time of the invention. Instead, the present invention is intended to be deployed in future computer systems with more advanced technology that can make use of all aspects of the present invention. It is expected that computer technology will continue to advance but one of ordinary skill in the art will be able to take the present disclosure and implement the described teachings on the more advanced computers or other digital devices such as mobile telephones or "smart" televisions as they become available.

Moreover, the present invention may be implemented on one or more distributed computers. Still further, the present invention may be implemented in various types of software languages including C, C++, and others. Also, one of ordinary skill in the art is familiar with compiling software source code into executable software that may be stored in various forms and in various media (e.g., magnetic, optical, solid state, etc.). One of ordinary skill in the art is familiar with the use of computers and software languages and, with an understanding of the present disclosure, will be able to implement the present teachings for use on a wide variety of computers.

The present disclosure provides a detailed explanation of the present invention with detailed explanations that allow one of ordinary skill in the art to implement the present invention into a computerized method. Certain of these and other details are not included in the present disclosure so as not to detract from the teachings presented herein but it is understood that one of ordinary skill in the art would be familiar with such details.

Figure 2:
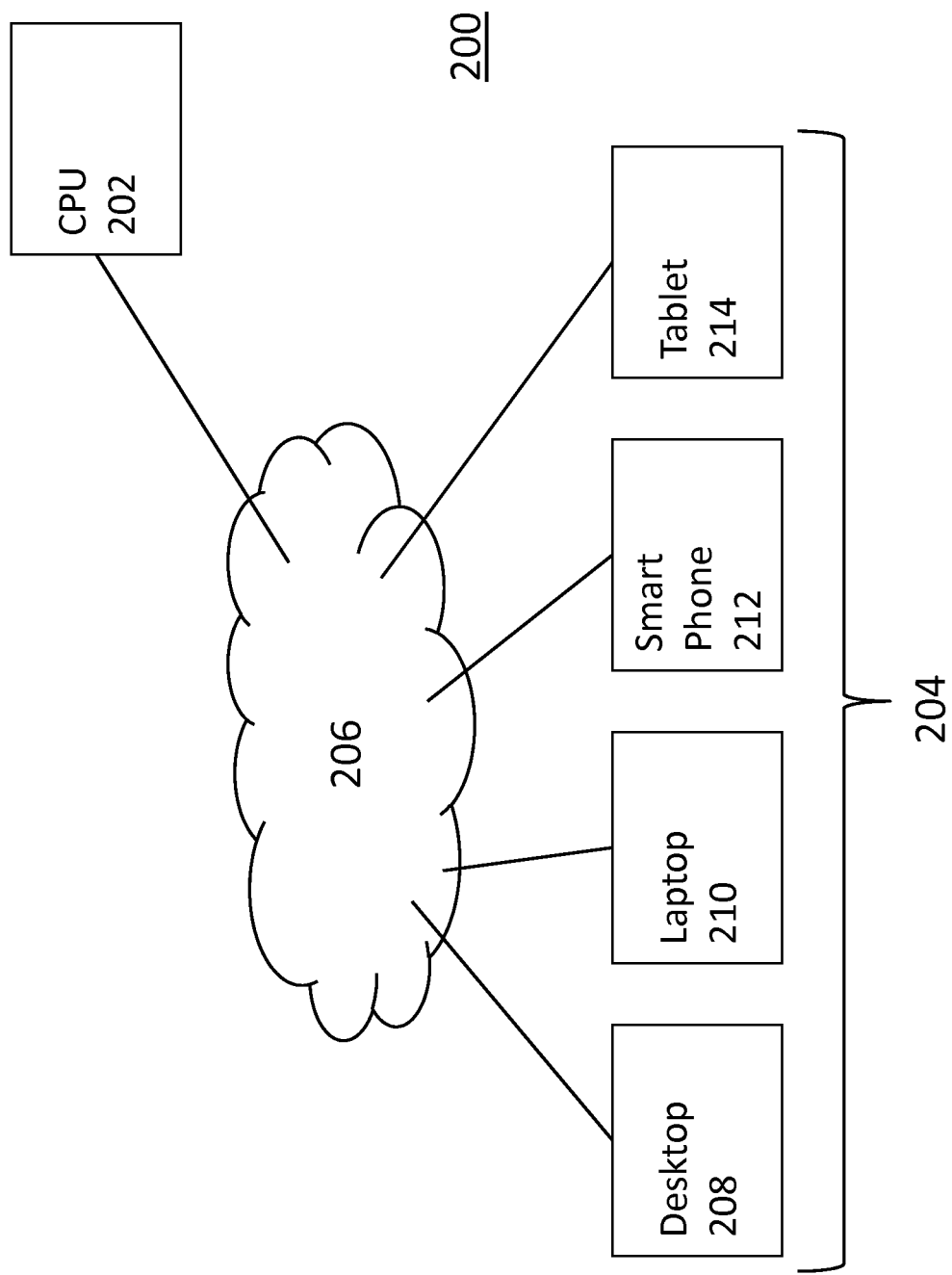
FIG. 2 is a block diagram of a networked computer system on which the present invention can be implemented.

In an embodiment of the invention as shown in FIG. 2, a computer server that implements certain of the methods of the invention is remotely situated from a user. Computer server 202 is communicatively coupled so as to receive information from a user; likewise, computer server 202 is communicatively coupled so as to send information to a user. In an embodiment of the invention, the user uses user computing device 204 so as to access computer server 202 via network 206. Network 206 can be the internet, a local network, a private network, a public network, or any other appropriate network as may be appropriate to implement the invention as described herein.

User computing device 204 can be implemented in various forms such as desktop computer 208, laptop computer 210, smart phone 212, or tablet device 214. Other devices that may be developed and are capable of the computing actions described herein are also appropriate for use in conjunction with the present invention.

In the present disclosure, computing and other activities will be described as being conducted on either computer server 202 or user computing device 204. It should be understood, however, that many if not all of such activities may be reassigned from one to the other device while keeping within the present teachings. For example, for certain steps computations that may be described as being performed on computer server 202, a different embodiment may have such computations performed on user computing device 204.

In an embodiment of the invention, computer server 202 is implemented as a web server on which Apache HTTP web server software is run. Computer server 202 can also be implemented in other manners such as an Oracle web server (known as Oracle iPlanet Web Server). In an embodiment computer server 202 is a UNIX-based machine but can also be implemented in other forms such as a Windows-based machine. Configured as a web server, computer server 202 is configured to serve web pages over network 206 such as the internet.

In an embodiment, user computing device 204 is configured so as to run web browser software. For example, where user computing device 204 is implemented as desktop computer 208 or laptop computer 210, currently available web browser software includes Internet Explorer, Firefox, and Chrome. Other browser software is available for different applications of user computing device 204. Still other software is expected to be developed in the future that is able to execute certain steps of the present invention.

In an embodiment, user computing device 204, through the use of appropriate software, queries computer server 202. Responsive to such query, computer server 202 provides information so as to display certain graphics and text on user computing device. In an embodiment, the information provided by computer server 202 is in the form of HTML that can be interpreted by and properly displayed on user computing device 204. Computer server 202 may provide other information that can be interpreted on user computing device.

Figure 3:
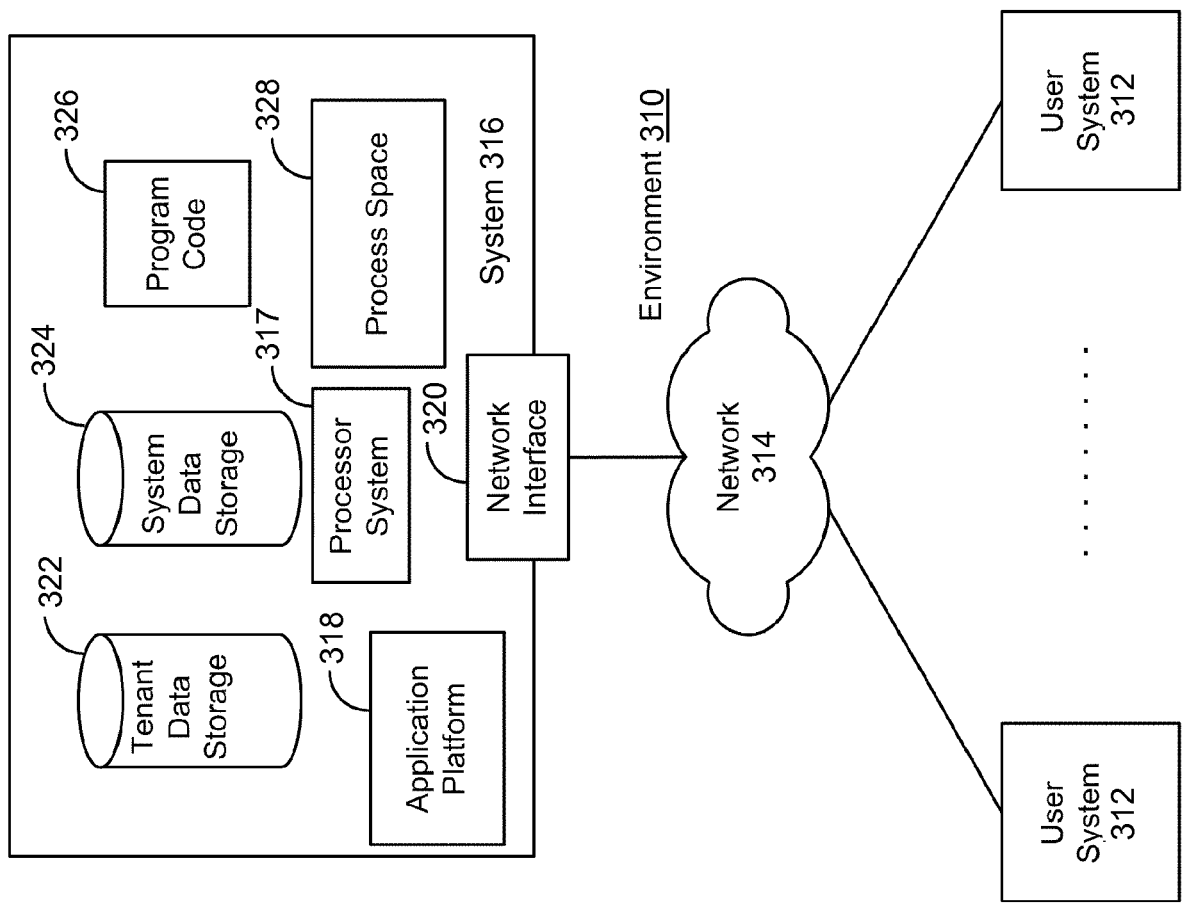
FIG. 3 is a block diagram of an example of an environment on which embodiments of the present invention can be implemented.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328.

In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, on-demand database service 316 and system 316 will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. While an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks, often referred to as the Internet, that network will be used in many of the examples herein. It should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a browser for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; other alternative configurations may be used instead.

In one embodiment, system 316, shown in FIG. 3, implements a web-based customer relationship management (CRM) system that is generally a system to manage customer and client relationships, among other things. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. It should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium processor or the like. Similarly, system 316 (and additional instances of an MTS, where more than one is present) and all of their components might be operator configurable using application(s) including computer code to run using a central processing unit such as processor system 317, which may include an Intel Pentium processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term server is meant to include a computer system, including processing hardware and process space(s), and an associated storage system and database application (e.g., OODBMS or RDBMS) as is well known in the art. It should also be understood that server system and server are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 4:
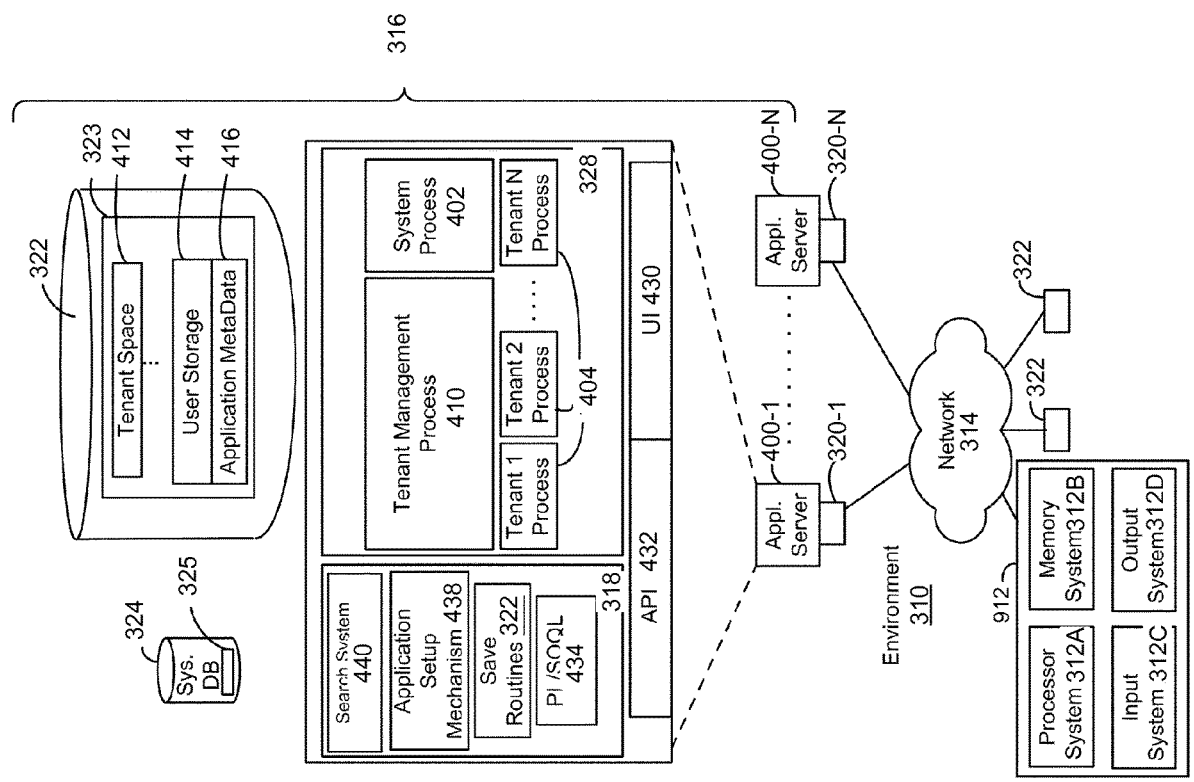
FIG. 4 is a block diagram of an example of an environment on which embodiments of the present invention can be implemented that illustrates, among other things, alternative interconnections among system elements.

FIG. 4 also illustrates environment 310. In FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers 400-1 through 400-N, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection.

For example, one application server 400-1 might be coupled via the network 314 (e.g., the Internet), another application server 400-N-1 might be coupled via a direct network link, and another application server 400-N might be coupled by yet a different network connection. Transfer Control Protocol and Internet Protocol (TCP/IP) are typical protocols for communicating between application servers 400 and the database system. It will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A table is one representation of a data object, and may be used herein to simplify the conceptual description of objects and custom objects. It should be understood that table and object may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word entity may also be used interchangeably herein with object and table.

In some multi-tenant database systems, tenants may be allowed to create and store custom objects, or they may be allowed to customize standard entities or objects, for example by creating custom fields for standard objects, including custom index fields. Those of ordinary skill in the art are familiar with systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple tables are in fact stored in one large table or that their data may be stored in the same table as the data of other customers.

Certain embodiments of the present invention can be deployed as an application, component, or add-on to a CRM system. For example, CRM systems typically include interfaces (e.g., Application Program Interfaces) for extending the functionality of the CRM system. In this way, embodiments of the present invention modify or supplement the behavior of certain CRM systems to extend their functionality as described herein.

In certain embodiments to be described below, reference will be made to object fields as they may be implemented in certain CRM systems. To be clear, however, the use of the term objects or other terms not intended to be limiting nor intended to reference certain types of CRM systems. Instead, the description of the present embodiment is intended to be exemplary.

In an embodiment of the present invention, a Response object will be described that collects and synchronizes information from other types of objects. For example, in an embodiment of the present invention a Response object will be described as collecting information from a plurality of objects at different points in time. It should be noted that the Response object is a name used is describing the present invention and is not intended to be limiting. Many names can be given to the functionality of embodiments of the present invention.

In certain embodiments of the present invention, information collected in the Response object can be used, for example, by marketers or sales managers, to understand campaign performance. Moreover, detailed reports, charts, and graphs can be generated from such information using tools otherwise available from the CRM systems as would be understood by those of ordinary skill in the art.

Figure 5:
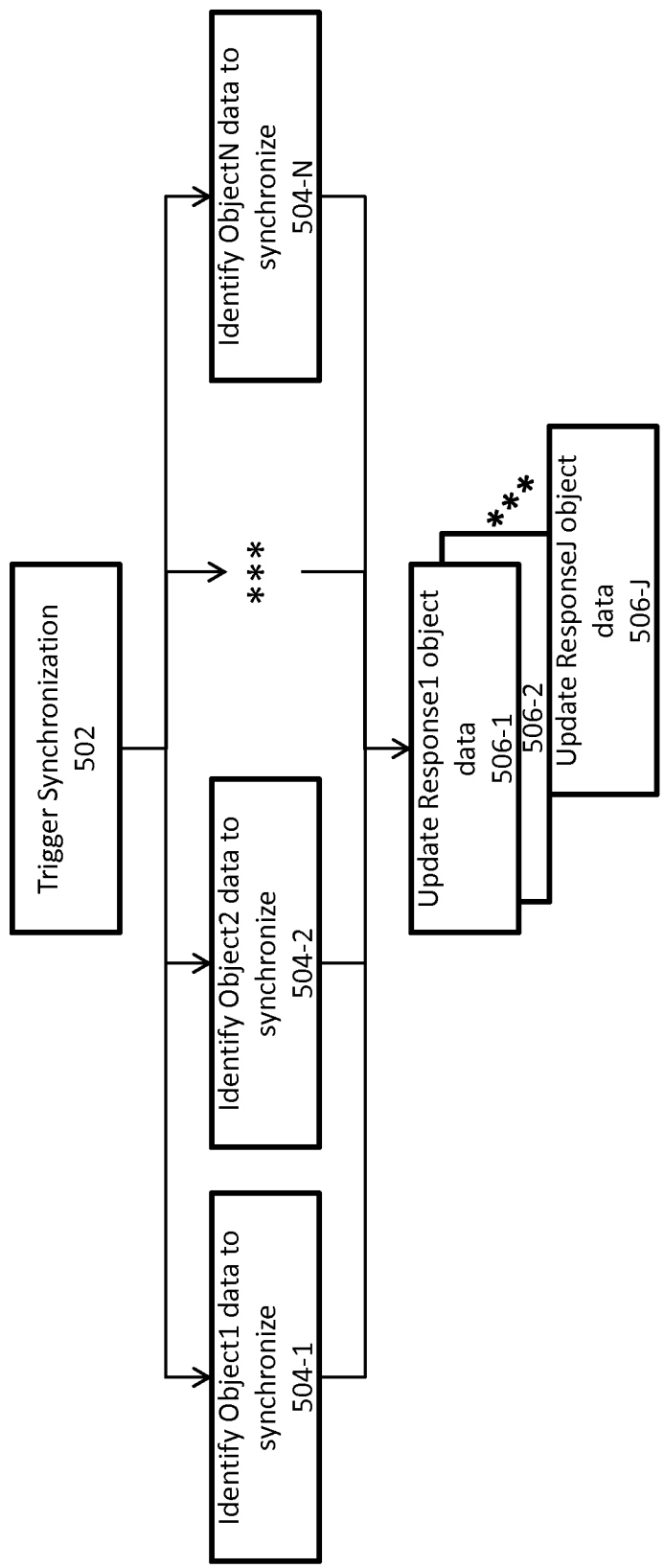
FIGS. 5-10 are flowcharts of methods according to embodiments of the present invention for synchronizing objects in a CRM system.

Shown in FIG. 5 is method 500 for synchronizing a plurality of objects (e.g., Object through ObjectN) to a separate object (e.g., Response1 object). In an embodiment, information from the various objects, Object1 through ObjectN, is captured in a distinct object, such as any one or a plurality of response objects Response1 through ResponseJ. In an embodiment, information is synchronized from the various objects, Object through ObjectN, as they would be contained in a CRM system. For example, in an embodiment of the present invention certain objects from Object1 through ObjectN may include a Lead or Contact Object, a Campaign object, and an Opportunity Object that is synchronized into a Response1 object, for example. In this way, the results for a given Lead or Contact can be directly attributed to the Campaign or Opportunity without having to guess as may be necessary in certain typical CRM systems. As will be demonstrated below, embodiments of the present invention provide a synchronization process that normalizes the reporting and sales process across different objects, including Leads, Contacts, Campaigns, and Opportunities, to allow for a unified reporting on sales performance, revenue attribution, and campaign performance.

It should be noted that the described embodiments are illustrative and do not limit the present invention. It should further be noted that the steps of method 500 need not be implemented in the order described. Indeed, certain of the described steps do not depend from each other and can be interchanged.

Figure 6:
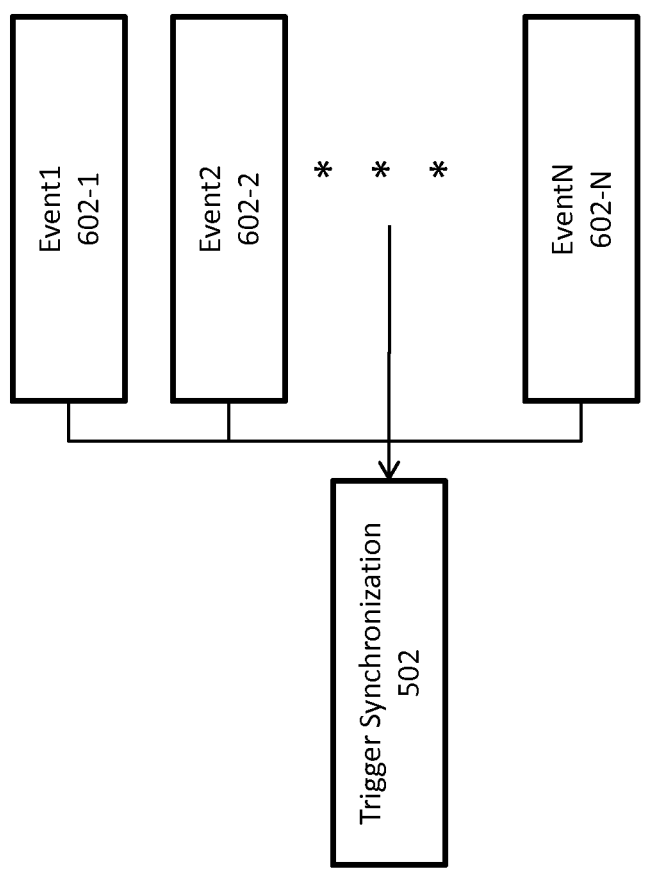

As shown in FIG. 5, at step 502 an indication is received that triggers synchronization according to an embodiment of the invention. Various types of triggers can be implemented in different embodiments of the present invention. Shown in FIG. 6, is an example, of a plurality of N types (e.g., Event1 through EventN) of events that can occur at steps 602-1 through 602-N, respectively. For example, synchronization can occur upon the change of a predetermined field. Alternatively, synchronization can occur upon the creation of a predetermined object. Also, synchronization can occur on a predetermined scheduled. Moreover, synchronization can be user initiated. It should be further noted that the occurrence of particular events may differentially trigger synchronization of particular sets of data within predetermined objects. Alternatively, the occurrence of other events may trigger synchronization of predetermined data fields within predetermined objects. In yet another embodiment, the occurrence of yet other events may trigger synchronization of only those fields where data has changed.

In an embodiment of the present invention, the various response objects, e.g., Response1 through ResponseJ, include an Active/Inactive status field. For example, the Active/Inactive status field may indicate whether one or a plurality of objects from Object through ObjectN are in an active state or an inactive state. In an embodiment, an active state may indicate that the object at issue is in an active sales state such that a sale can be made. Alternatively, an inactive state may indicate that the objet at issue is in an inactive sales state where no sale can likely be made. To be discussed further below are other details for performing synchronization according to embodiments of the present invention.

With reference back to FIG. 5, at step 504-1, data from Object1 is identified as desired to be synchronized. In an embodiment of the invention, data to be synchronized includes data that has changed from an earlier synchronization. In another embodiment of the present invention, data to be synchronized is predetermined. For example, predetermined data can be identified as data that will always be synchronized upon a synchronization event. In yet another embodiment of the present invention, data to be synchronized is a predetermined set of data that need not have changed. Other examples of data that can be synchronized will be discussed further below.

For example, where an object at issue is a Lead or Contact, information to be synchronized may include a status field indicating whether active sales engagement is being made with the Lead or Contact. Other information may include a score field indicating a subjective or objective criteria for the likelihood that he Lead or Contact may lead to a sale. Still other system fields or user defined fields can be synchronized as may be desired by a system administrator or user of the present invention.

Further shown, in FIG. 5 are steps 504-2 through 504-N that represent steps similar to 504-1 but which are performed on other objects. For example, in a generalized embodiment, data from a plurality of N objects can be synchronized to a single Response1 or to a plurality of responses up to ResponseJ. In another embodiment of the present invention, two objects (e.g., Object1 and Object2) are synchronized to a single Response1. These and other embodiments will be described further below.

At step 506-1, information from at least one of the objects from Object1 though ObjectN are updated into a Response1 object. In this way, over the course of several iterations of method 500, the Response1 object is able to maintain information from a plurality of other objects (e.g., Object through ObjectN) that a traditional CRM system does not maintain. For example, whereas a traditional CRM system maintains separate information for prospective customers and existing customers, such traditional CRM systems do not synchronize and maintain the information that is separately generated over time for these different objects. The present invention, however, through the synchronization process of method 500 is able to continuously maintain and update data across different objects to obtain an improved understanding of customer relationships and campaigns, for example.

Further shown, in FIG. 5 are steps 506-2 through 506-J that represent steps similar to 506-1 that can be performed by synchronizing information from other objects. For example, in a generalized embodiment, data from a plurality of N objects can be synchronized to a single Response1 or to a plurality of responses up to ResponseJ. In another embodiment of the present invention, two objects (e.g., Object and Object) are synchronized to a single Response1. These and other embodiments will be described further below.

Figure 7:
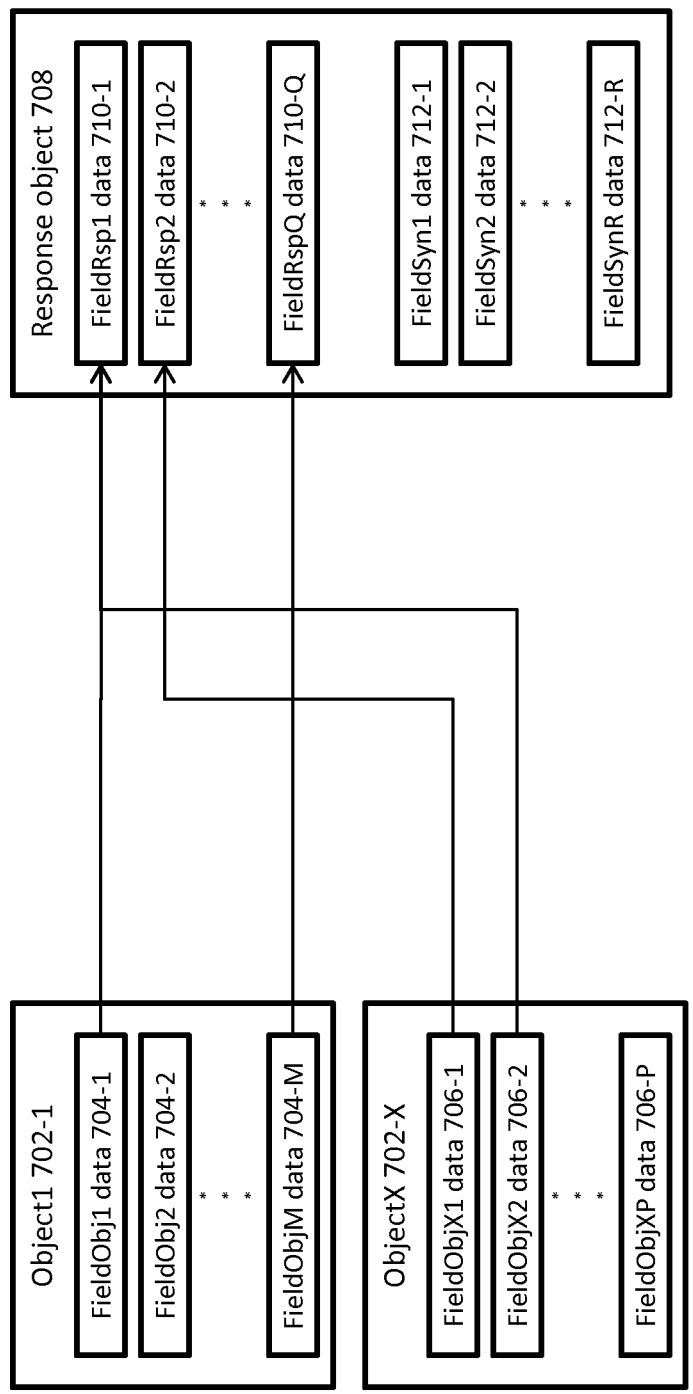

Shown in FIG. 7 is an exemplary manner in which data from multiple objects is synchronized into a Response object. For example as shown, predetermined data from various fields in Object1 702-1 and ObjectX 702-X are synchronized into the Response object 708. As shown, FieldObjM data 704-M is synchronized into FieldRspQ data 710-Q and FieldObjX1 data 706-1 is synchronized into FieldRsp2 data 710-2. This synchronization is done into distinct fields. Note, however, that information from different objects can be mapped into the same field in the Response object such as FieldObj1 data 704-1 from Object 702-1 and FieldObjX2 data 706-2 from ObjectX 702-X that are each mapped to FieldRsp1 data 710-1 of Response object 708. This may be advantageous when it is expected that only one item of information from a collection is to change.

Also shown in FIG. 7 are data fields that are not to be synchronized such as FieldObj2 data 704-2 from Object 702-1 and FieldObjXP data 706-P from ObjectX 702-X. These fields may not be synchronized because they may not contain information that changes over time or may not contain information that is useful for a predetermined goal.

Also shown in FIG. 7 are custom Response fields FieldSyn1 data 712-1 through FieldSynR data 712-R that are customized to meet the predetermined needs or goals of Response object 708. For example, such fields may be custom fields that are defined by a user and then populated by the user as necessary. For example, a custom field in an object in a traditional CRM system can be a field that is not a standard field defined by the CRM system. In certain situations, a custom field can be defined by CRM administrators or as part of a custom application or addition to the CRM system such as implemented in an embodiment of the present invention.

A particular embodiment will now be described with reference to, among other things, a Lead Object and a Contact object. In certain CRM systems a Lead object is generally an object that refers to a prospective customer or contact, among other things. For example, it may contain information about the prospective customer or information about the nature of the prospective customer along with a reference to another object containing detailed identifying information. For example, a Lead object may reference a separate object that contains the identifying information for the prospective customer or contact such as the customer address and phone number.

In certain CRM systems a Contact is an object that generally refers to a customer. For example, a Contact object contains identifying information for an individual, among other things. It may also contain company information or be associated with company information through other ways. Also, it may reference other objects that contain identifying information such as company information or account information.

Figure 8:
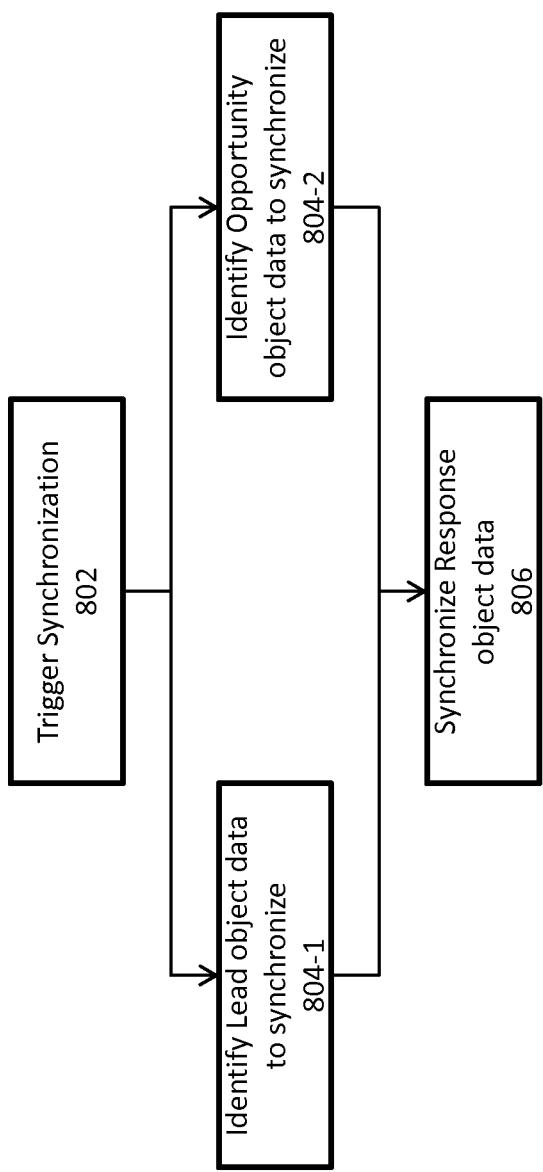

Shown in FIG. 8 is a method for synchronizing Lead object and Opportunity object information into a Response object according to an embodiment of the present invention. In an embodiment, a Response object represents a single response, but in another embodiment it can represent multiple responses. A Response object may be a built-in object, or a custom object. In an embodiment of the present invention, a Response object is associated with a sales campaign and a Campaign object. In another embodiment, a Response object can also be associated with a sales opportunity and an Opportunity object.

Among other things, the Response object synchronizes information from other objects (e.g., Lead object, Contact objects, Campaign objects, or Opportunity objects, among others) responsive to an interaction with the CRM system that can be initiated directly or indirectly by an individual who is represented by a Lead or a Contact. The interaction may be through automated means such as when an individual fills out a form on a web site or through indirect means such as when an individual calls a salesperson and the information is entered manually into the CRM system by a salesperson.

Shown in FIG. 8 is method 800 for synchronizing a Lead object and an Opportunity object to a third object, the Response object. It should be noted that the described embodiments are illustrative and do not limit the present invention. For example, the method of FIG. 8 can be implemented for Contact objects, Campaign objects, or many other objects as may be implemented in a CRM system. Indeed, many Response objects can also be implemented. It should further be noted that the steps of method 800 need not be implemented in the order described. Indeed, certain of the described steps do not depend from each other and can be interchanged.

Figure 9:
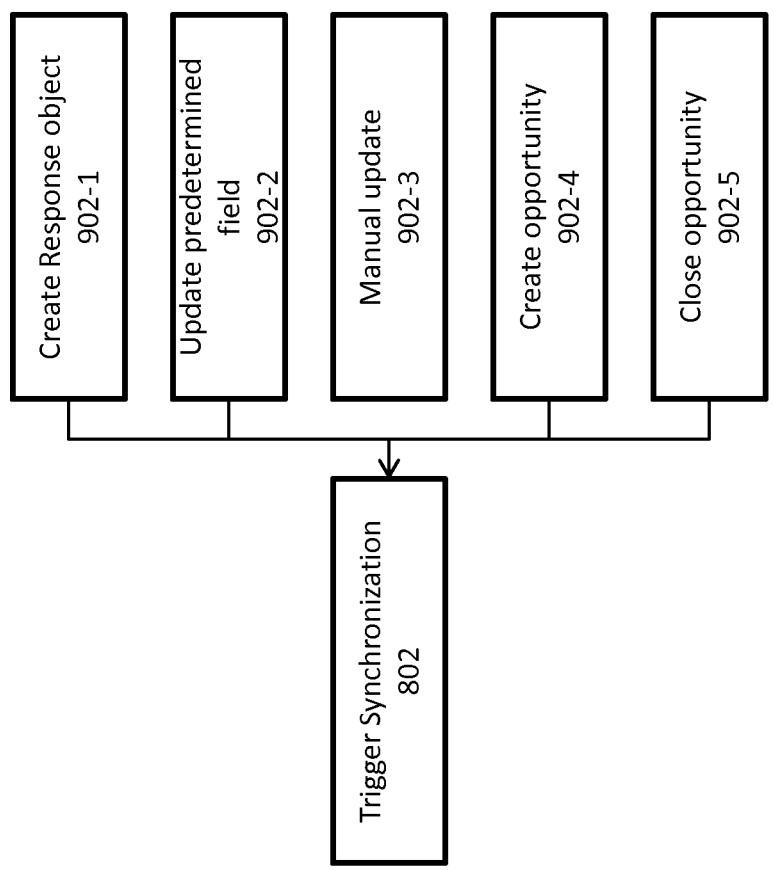

As shown in FIG. 8, at step 802 an indication is received that triggers synchronization according to an embodiment of the invention. Various types of triggers can be implemented in different embodiments of the present invention. Shown in FIG. 9 are examples of various events that occur at steps 902-1 through 902-5, respectively, that can trigger a synchronization of data. For example, synchronization can occur upon the creation of a Response object as shown in step 902-1. For example, where a CRM system user creates a Response object that is intended to collect information from a particular Lead object at step 902-1, step 802 is initiated to synchronize the Lead object information into a Response object.

In an embodiment of the present invention, the response objects, e.g., Response object of step 806, includes an Active/Inactive status field. For example, the Active/Inactive status field may indicate whether one or both of the Lead object or Opportunity object of steps 804-1 and 804-2, respectively, are in an active state or an inactive state. In an embodiment, an active state may indicate that the object at issue is in an active sales state such that a sale can be made. Alternatively, an inactive state may indicate that the Lead objet at issue is in an inactive sales state where no sale can likely be made.

An Active/Inactive status field can be used, for example, upon the creation of a response object at step 902-1. For example, if it is determined that upon creation of a response object at step 902-1, that the Lead at issue is in an inactive state, a synchronization may be performed but the status of the Response object may be set to a state indicating that no further synchronizations may be necessary. For example, the status may indicate that the opportunity is resolved and no further action is required. Alternatively, the status may indicate that the opportunity is resolved because the Lead, for example, is already engaged for a separate opportunity. In this situation, only certain predetermined fields may be synchronized.

In another embodiment, if it is determined that upon creation of a response object at step 902-1, the Lead at issue is in an active state, a synchronization may be performed and the status of the Response object may be set to a state indicating that further synchronizations may be necessary. For example, the status may indicate that the opportunity is not resolved and certain fields may continue to be synchronized such as a score and other system- or user-specified fields.

In another embodiment, synchronization is triggered upon updating a predetermined field at step 902-2. For example, where a response such as a telephone call is received from a lead or contact, synchronization step 802 is triggered. In yet another embodiment, a user can provide a command at step 902-3 to initiate synchronization step 802.

In still another embodiment, when an opportunity with the lead is initiated an Opportunity object is created at step 902-4 and synchronization step 802 is initiated to collect information from the Lead object at step 804-1 and the Opportunity object at step 804-2. An Active/Inactive status field can be used, for example, upon the creation of an opportunity object at step 902-4. For example, if it is determined that upon creation of an opportunity object at step 902-4, that the Lead at issue is in an inactive state, a synchronization may be performed but the status of the Response object may be set to a state indicating that no further synchronizations may be necessary. For example, the status may indicate that the opportunity is resolved and no further action is required. Alternatively, the status may indicate that the opportunity is resolved because the Lead, for example, is already engaged for a separate opportunity. In this situation, only certain predetermined fields may be synchronized.

In another embodiment, if it is determined that upon creation of an Opportunity object at step 902-4, the Lead at issue is in an active state, a synchronization may be performed and the status of the Response object may be set to a state indicating that further synchronizations may be necessary. For example, the status may indicate that the opportunity is not resolved and certain fields may continue to be synchronized such as a score and other system- or user-specified fields.

In still another embodiment, synchronization step 802 is initiated upon the closing of an opportunity as may be indicated in an Opportunity object. For example, where a sale is made and an opportunity is closed at step 902-5, synchronization is initiated at step 802 to collect all the then-existing information in the Lead object at step 804-1 and the Opportunity object at step 804-2 into the Response object at step 806. In such a situation it may further be advantageous to purge or clear certain data that may become stale after an opportunity is closed. For example, if a contact was identified as having a budget for a purchase, upon closing the opportunity it may be advantageous to purge such data because it may later not be relevant. In another embodiment, a timeline that may be kept for either the Lead object or the Opportunity object may also be cleared upon closing of the opportunity at step 902-5.

The triggering events of FIG. 9 are only exemplary. In other embodiments, the occurrence of still other events may trigger synchronization.

With reference back to FIG. 8, at step 804-1, the Lead object data is identified as desired to be synchronized. In an embodiment of the invention, data to be synchronized includes data that has changed from an earlier synchronization. In another embodiment of the present invention, data to be synchronized is predetermined. For example, predetermined data can be identified as data that will always be synchronized upon a synchronization event. In yet another embodiment of the present invention, data to be synchronized is a predetermined set of data that need not have changed. Other examples of data that can be synchronized will be discussed further below.

At step 904-2, the Opportunity object data is identified as desired to be synchronized. In an embodiment of the invention, data to be synchronized includes data that has changed from an earlier synchronization. In another embodiment of the present invention, data to be synchronized is predetermined. For example, predetermined data can be identified as data that will always be synchronized upon a synchronization event. In yet another embodiment of the present invention, data to be synchronized is a predetermined set of data that need not have changed. Other examples of data that can be synchronized will be discussed further below.

At step 906, information from at least one of the Lead object or the Opportunity object is updated into the Response object. In this way, over the course of several iterations of method 900, the Response object is able to maintain information from the Lead object and the Opportunity object that a traditional CRM system does not maintain. For example, whereas a traditional CRM system maintains separate information for prospective customers (e.g., leads) and opportunities, such traditional CRM systems do not synchronize and maintain the information that is separately generated over time for these different objects. The present invention, however, through the synchronization process of method 800 is able to continuously maintain and update data across different objects to obtain an improved understanding of customer relationships and campaigns, for example. It should be noted that, in an embodiment, multiple Response objects may exist for the same Lead (or Contact) objects.

Figure 10:
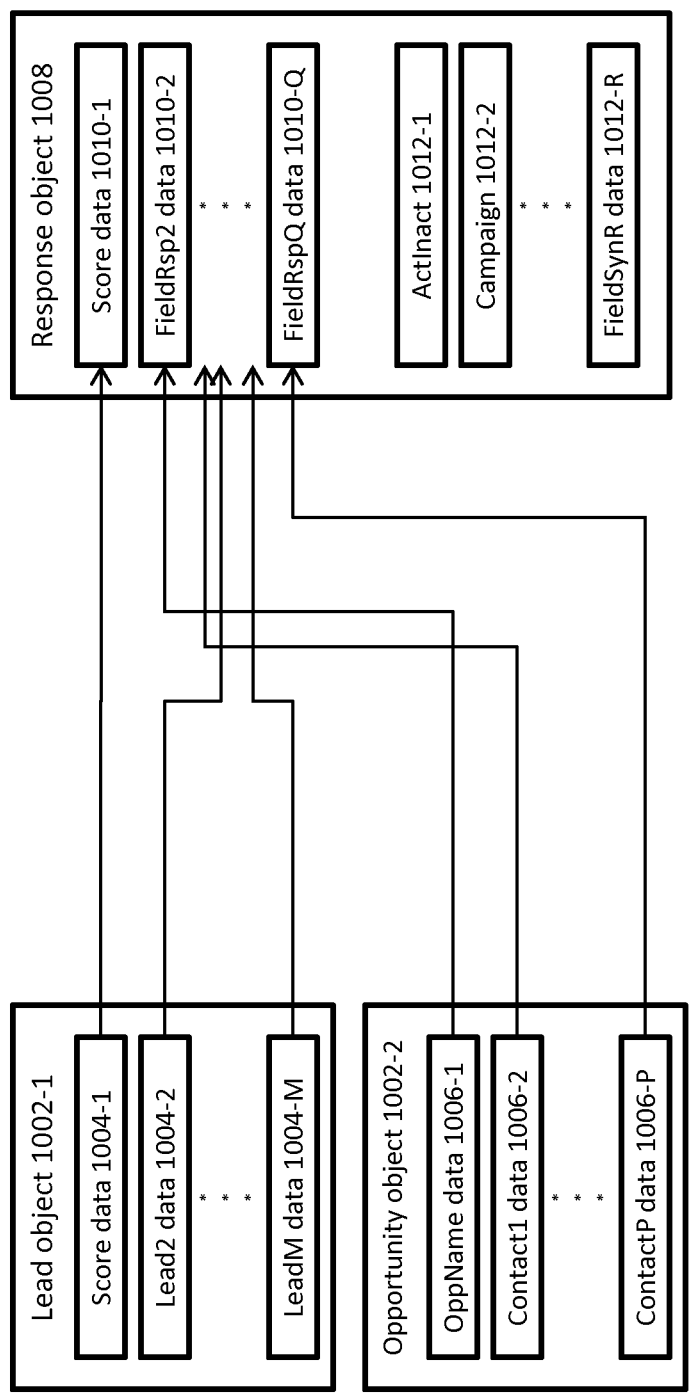

Shown in FIG. 10 is an exemplary manner in which data from multiple objects is synchronized into a Response object. For example as shown, predetermined data from Lead Object 1002-1 and Opportunity Object 1002-2 are synchronized into Response object 1008. As shown, Score data 1004-1 is synchronized into Score data 1010-1 and OppName data 1006-1 is synchronized into FieldRsp2 data 1010-2. This synchronization is done into distinct fields. Note, however, that information from different objects can be mapped into the same field in the Response object.

Not all fields from Lead Object 1002-1 or Opportunity object 1004-1 need to be synchronized depending for every embodiment. For example, fields may not be synchronized because they may not contain information that changes over time or may not contain information that is useful for a predetermined goal.

Also shown in FIG. 7 are custom Response field ActInact 1012-1 can be implemented as the Active/Inactive status field described above with reference to FIG. 9. Moreover, Campaign 1012-2 can be implemented to associate a lead or opportunity with a marketing campaign. Still other custom Response fields can be implemented to meet the needs of other embodiments of the present invention as would be understood by those of ordinary skill in the art. For example, such fields may be custom fields that are defined by a user and then populated by the user as necessary. For example, a custom field in an object in a traditional CRM system can be a field that is not a standard field defined by the CRM system. In certain situations, a custom field can be defined by CRM administrators or as part of a custom application or addition to the CRM system such as implemented in an embodiment of the present invention.

Various embodiments of the present invention have been described. It should be noted that the present invention is not limited to the described embodiments. Indeed, several of the described embodiments could be combined to provide further combined functionality. Also, it should be noted that the present invention can be modified in ways known to those of ordinary skill in the art without deviating from the present invention. For example, the present invention can be implemented in stand-alone CRM systems intended for individual users but can also be implemented in a networked environment.

One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

As persons skilled in the art will appreciate, the implementations and examples described herein in no way limit the scope of the present invention. While the foregoing is directed to embodiments of the present invention, other and further embodiments of the invention may be devised without departing from the basic scope thereof, and the scope thereof is determined by the claims that follow.

What is claimed is:

1. A computer-implemented method for synchronizing Customer Relationship Management (CRM) data, comprising:
    triggering, by a synchronization signal, an indication that information is to be synchronized from a plurality of objects in memory of a CRM system;
    collecting a plurality of sets of information from a respective plurality of objects, wherein the respective plurality of objects includes a first object of a first object type and a second object of a second object type, wherein the first object type is distinct from the second object type, wherein the plurality of sets of information includes information from the first object and the second object, and wherein the first object and second objects are selected from a lead object, a contact object, a campaign object, or an opportunity object;
    recording in memory a first set of response synchronization information that includes the plurality of sets of information into a first response object;
    overwriting in memory at least a subset of information from the plurality of sets of information in the plurality of objects; and
    recording in memory a second set of response synchronization information into the first response object.

2. The method of claim 1, wherein the synchronization signal is generated responsive to a first event.

3. The method of claim 2, wherein the first event is a creation of the first response object.

4. The method of claim 2, wherein the first event is an updating of a predetermined field.

5. The method of claim 2, wherein the first event is a manual update.

6. The method of claim 2, wherein the first event is a creation of an opportunity object.

7. The method of claim 2, wherein the first event is a closing of an opportunity object.

8. The method of claim 1, wherein the second set of response synchronization information includes an indication of whether the first response object is active.

9. The method of claim 1, wherein one of the plurality of objects is a prospective client object and one of the plurality of sets of information is information from the prospective client object.

10. The method of claim 1, wherein one of the plurality of objects is a customer object and one of the plurality of sets of information is information from a customer object.

11. A non-transitory computer-readable medium including instructions that, when executed by a processing unit, cause the processing unit to implement a method for synchronizing Customer Relationship Management (CRM) data, by performing the steps of:
    triggering, by a synchronization signal, an indication that information is to be synchronized from a plurality of objects in memory of a CRM system;
    collecting a plurality of sets of information from a respective plurality of objects, wherein the respective plurality of objects includes a first object of a first object type and a second object of a second object type, wherein the first object type is distinct from the second object type, wherein the plurality of sets of information includes information from the first object and the second object, and wherein the first object and second objects are selected from a lead object, a contact object, a campaign object, or an opportunity object;
    recording in memory a first set of response synchronization information that includes the plurality of sets of information into a first response object;
    overwriting in memory at least a subset of information from the plurality of sets of information in the plurality of objects; and
    recording in memory a second set of response synchronization information into the first response object.

12. The non-transitory computer-readable medium of claim 11, wherein the synchronization signal is generated responsive to a first event.

13. The non-transitory computer-readable medium of claim 12, wherein the first event is a creation of the first response object.

14. The non-transitory computer-readable medium of claim 12, wherein the first event is an updating of a predetermined field.

15. The non-transitory computer-readable medium of claim 12, wherein the first event is a manual update.

16. The non-transitory computer-readable medium of claim 12, wherein the first event is a creation of an opportunity object.

17. The non-transitory computer-readable medium of claim 12, wherein the first event is a closing of an opportunity object.

18. The non-transitory computer-readable medium of claim 11, wherein the second set of response synchronization information includes an indication of whether the first response object is active.

19. The non-transitory computer-readable medium of claim 11, wherein one of the plurality of objects is a prospective client object and one of the plurality of sets of information is information from the prospective client object.

20. The non-transitory computer-readable medium of claim 11, wherein one of the plurality of objects is a customer object and one of the plurality of sets of information is information from a customer object.

21. A computing device comprising:
a data bus;
a memory unit coupled to the data bus;
at least one processing unit coupled to the data bus and configured to
trigger, by a synchronization signal, an indication that information is to be synchronized from a plurality of objects in memory of a CRM system;
collect a plurality of sets of information from a respective plurality of objects, wherein the respective plurality of objects includes a first object of a first object type and a second object of a second object type, wherein the first object type is distinct from the second object type, wherein the plurality of sets of information includes information from the first object and the second object, and wherein the first object and second objects are selected from a lead object, a contact object, a campaign object, or an opportunity object;
record in memory a first set of response synchronization information that includes the plurality of sets of information into a first response object;
overwrite in memory at least a subset of information from the plurality of sets of information in the plurality of objects; and
record in memory a second set of response synchronization information into the first response object.

* * * * *